United States Patent [19]

Sugiura et al.

[11] Patent Number: 4,773,052
[45] Date of Patent: Sep. 20, 1988

[54] DUAL MODE DISK PLAYER/RECORDER

[75] Inventors: Satoshi Sugiura; Katsuharu Sato, both of Saitama, Japan

[73] Assignee: Pioneer Electronic Corporation, Tokyo, Japan

[21] Appl. No.: 778,098

[22] Filed: Sep. 20, 1985

[30] Foreign Application Priority Data

Sep. 20, 1984 [JP] Japan ............................. 59-142481[U]
Sep. 20, 1984 [JP] Japan ............................. 59-142482[U]
Sep. 20, 1984 [JP] Japan ............................. 59-142483[U]

[51] Int. Cl.⁴ ............................................. G11B 7/095
[52] U.S. Cl. .......................................... 369/2; 369/44; 369/45; 369/46; 369/190; 358/342
[58] Field of Search ........................... 369/44–46, 369/54, 58, 59, 2, 190, 275, 265; 358/342

[56] References Cited

U.S. PATENT DOCUMENTS

| | | | |
|---|---|---|---|
| 3,002,758 | 10/1961 | Bara | 369/190 |
| 3,966,330 | 6/1976 | Ridler et al. | 369/190 |
| 4,462,095 | 7/1984 | Chen | 369/44 |
| 4,532,522 | 7/1985 | Tsumoda et al. | 369/109 |
| 4,575,836 | 3/1986 | Seto | 369/265 |
| 4,607,357 | 8/1986 | Okano | 369/44 |

FOREIGN PATENT DOCUMENTS 57-179954  11/1982  Japan ................................ 369/54
2083252    3/1982  United Kingdom .

OTHER PUBLICATIONS

Pioneer CLD-900 description, 1985.

Primary Examiner—Raymond F. Cardillo
Assistant Examiner—Hoa T. Nguyen
Attorney, Agent, or Firm—Sughrue, Mion, Zinn, Macpeak and Seas

[57] ABSTRACT

In a compatible recording and reproducing apparatus which is capable of recording and reproducing information on both a video disk and a digital audio disk, a relative angle between an optical axis of a laser beam emitted from a pickup and the disk is adjusted so as to be suitable for the disk loaded on the apparatus. Further, the movement of the pickup in the radial direction of the disk is regulated in accordance with the difference in the outer diameter of the two kinds of disks. A problem due to the difference of the track pitch in the two kinds of disks is solved by moving the pickup in a direction perpendicular to a radial direction of the disk. In addition, an objective lens for focusing the laser beam on the disk is selected within a predetermined range of an effective numerical aperture in order to simplify an optical system of the apparatus.

9 Claims, 6 Drawing Sheets

RF OF VIDEO DISK

AMOUNT OF JITTER OF DIGITAL AUDIO DISK

RELATIVE ANGLE $\theta_v$     $\theta_a$

TRACKING ERROR SIGNAL

DUAL MODE DISK PLAYER/RECORDER

BACKGROUND OF THE INVENTION

The present invention relates to an apparatus for optically recording information on and reproducing information from two different information disks (discs). More particularly, the invention relates to a compatible apparatus for recording and reproducing information on both a video disk and a digital audio disk.

Recent years have seen an increasing use of systems which optically record information on and/or reproduce information from a recording medium. Typical examples of such optical recording systems are video disk and digital audio disks. On the video disk, video and audio information are recorded in the form of analog signals. On the digital audio disk, on the other hand, audio information is recorded in the form of a digital signal.

In view of the similarity of the mechanisms used in driving these two types of disks and of the methods for optically recording and reproducing these signals, a demand has arisen in which a single optical recording and reproducing apparatus be provided which is usable for both the video disk and the digital audio disk. Thus, a compatible player has been provided.

However, if an apparatus is used with a video disk (or digital audio disk), operational characteristics are not satisfactory when this apparatus is used for reproducing information on the digital audio disk (or video disk) since the two disks use different formats for information recording. The information to be recorded on the video disk is an FM-modulated television signal, whereas on the digital audio disk, an EFM (Eight-to-Fourteen modulation) modulated audio disk (this may include a video or other signals), or the digital signal is recorded. Furthermore, the video disk differs from the digital audio disk not only in such design parameters as thickness, outside diameter, weight, pitch of adjacent tracks, reflectance and the diameter of the center hole but also in terms of the material of which the disks are made.

Due to the foregoing differences between the video disk and the digital audio disk, various problems are encountered in providing a compatible recording/reproducing apparatus.

Firstly, if the inclination of an optical axis of the laser beam with respect to the disk is adjusted optimumly for either one of the video and digital audio disks, no optimum information reproduction is obtained for the other disk, with the result that information cannot be reproduced on one of the disks with good S/N ratios. This problem is caused by the fact that the video disk and the digital audio disk are different in outer diameter whereby the video disk being loaded sags by a different degree than the digital audio disk.

Figure 1A:
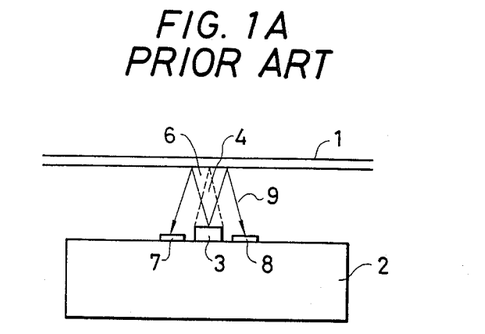
FIGS. 1A and 1B are a front view and a plan view of the conventional angle adjusting means, respectively.
Figure 1B:
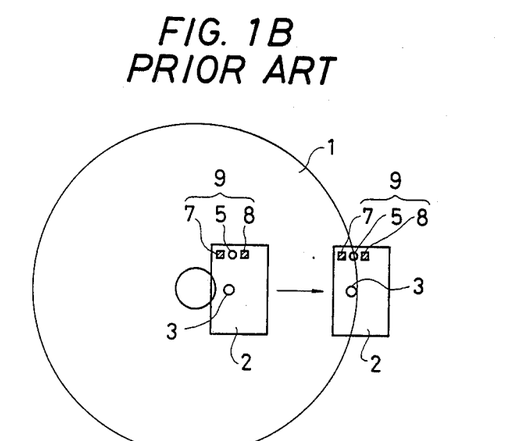

More specifically, in an optical recording/reproducing apparatus, an angle between the optical axis and the disk must be maintained in a certain relation, and ideally they are perpendicular to each other. FIGS. 1A and 1B illustrate an arrangement for realizing such angular adjustment on a digital audio disk player. In the Figures, reference numeral 1 denotes a digital audio disk as an information recording disk, and 2, a pickup as record/reproduce means. The pickup 2 has an objective lens 3 from which a laser beam 4 is directed against the disk 1 so as to reproduce information. Numeral 5 denotes a light source such as a light-emitting diode (FIG. 1B) and light 6 emanating from the light source is reflected from the disk 1 and received by two light-receiving elements 7 and 8. These elements constitute an angle detection means 9 for detecting the relative angle between the optical axis (pickup 2) of the laser beam and the disk 1.

The angle detection means 9 is so designed that if the optical axis has a certain angle with respect to the disk 1 (ideally, they are perpendicular with respect to each other) and when desired characteristics (e.g. jitter characteristics) are obtained, the difference between the output signals from the light-receiving elements 7 and 8 that are produced as a result of incidence of light reflected from the disk 1 after issuance from the light source 5 is zero. Therefore, if the relative angle of the optical axis fails to satisfy the predetermined relation with the disk, the balance between the amounts of light received by the elements 7 and 8 changes and a corresponding differential signal appears. By operating drive means (not shown) for the pickup 2 in response to this signal, servo control can be realized so that the optical axis is maintained to have the predetermined angle with respect to the disk.

Figure 2:
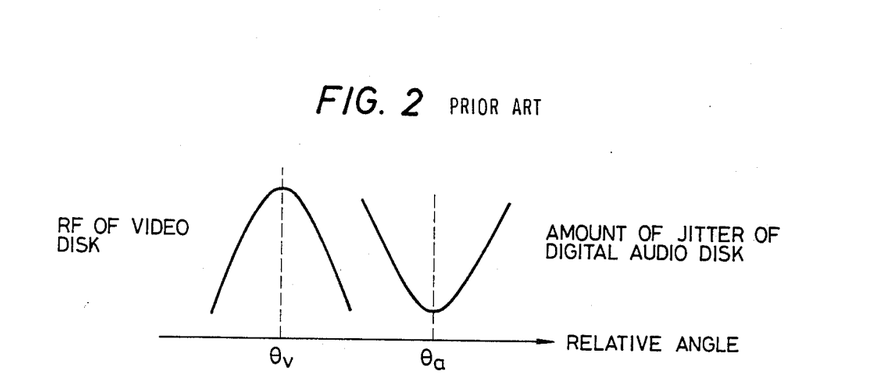
FIG. 2 is a characteristic diagram of the device shown in FIGS. 1A and 1B.

In the mode of reproduction on a video disk, it is preferred to reproduce an RF (HF) signal having the highest possible level. On the other hand, with the digital audio disk, the amount of jitter should be minimized. The relative angle $\theta v$ between the optical axis and the disk that ensures the reproduction of the highest level of RF signal on the video disk is not necessarily the same as the angle $\theta a$ that reduces the amount of jitter to minimum level during reproduction on the digital audio disk. Therefore, if the reference position for the angle of the optical axis (pickup 2) is set to a value that is optimum for the video disk, the amount of jitter that occurs during reproduction on the digital audio disk cannot be reduced to a minimum level. On the other hand, if the reference position is set to a value that is optimum for the digital audio disk, no RF signal having a maximum level can be reproduced on the video disk (see FIG. 2).

Secondly, when the pickup 2 moves on the disk 1 in its radial direction and reaches a point close to the outermost periphery as shown in FIG. 1B, the light-receiving element 8 in the angle detection means 9 comes to be positioned outside the disk even if the objective lens 3 is positioned within the boundary of the disk 1 and this causes failure in the reception of the light from the light source 5 to element 8, which may lead to misoperation of the recording apparatus. The potentional of such misoperation is increased as the diameter of the disk decreases, so in designing a "compatible" recording/reproducing apparatus all parameters must be determined on the basis of the smaller-diameter disk, i.e., digital audio disk. This, however, restricts the position where the angle detection means is installed, thereby reducing the freedom in designing the apparatus.

Thirdly, due to the fact that the track pitch of adjacent recording tracks varies with the type of disk, the following problems are encountered.

The optical information recording/reproducing system uses the pickup as optical means, and in order for this pickup to accurately follow the recording tracks on the information recording disk, a tracking servo system generating a tracking error signal is provided, and on the basis of this error signal, the position of the pickup in the radial direction of the disk with respect to the recording tracks is controlled. The "three-beam" system is currently used to generate the tracking error signal.

Figure 3:
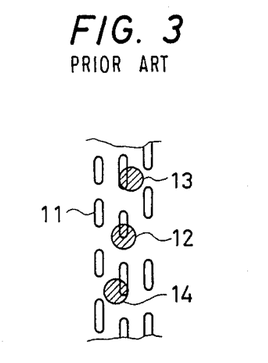
FIG. 3 is a diagram showing the position of recording tracks relative to detecting beam spots.
Figure 4:
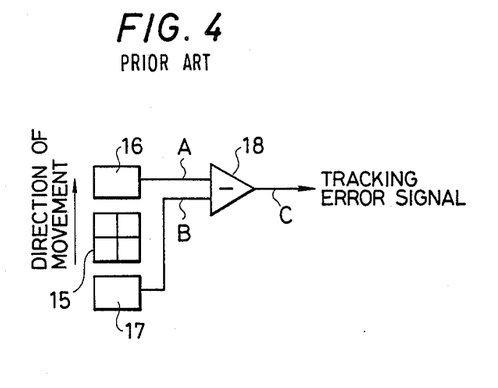
FIG. 4 is a block diagram for the circuit used in generating a tracking error signal.

FIGS. 3 and 4 are illustrations of the principle and operation of the three-beam system. In FIG. 3, reference numeral 11 indicates an information pit forming part of a recording track. In addition to a recording information detecting beam spot 12, two tracking information detecting beam spots 13 and 14, one preceding the spot 12 and the other following spot 12, are applied from the pickup (not shown) to illuminate the recording surface of the disk.

In FIG. 4, the light spot 12 reflected from the recording surface is applied to a "four-division" type photodetector 15, and four outputs from the photodetector 15 are summed in an adder (not shown) to provide a readout signal. Photodetectors 16 and 17 that respectively detect the light intensities of the beam spots 13 and 14 produce outputs A and B, which are fed into a subtractor 18 where the difference between A and B is taken to produce a subtraction output C which is subsequently used as a tracking error signal.

Figure 5:
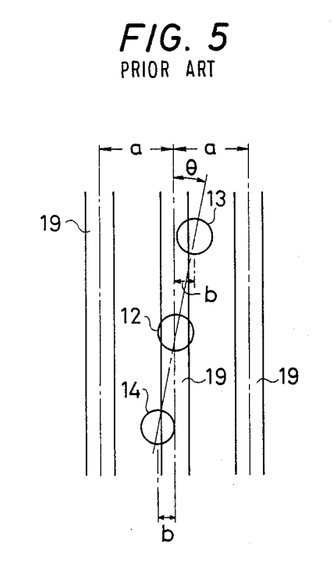
FIG. 5 is a diagram showing the position of a recording track relative to detecting beam spots assuming the use of the reference track pitch.
Figure 6:
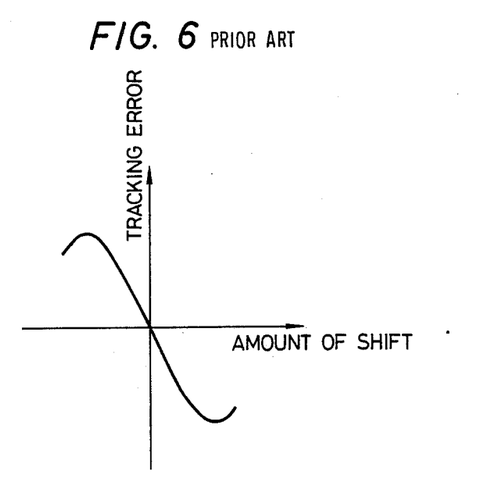
FIG. 6 is a profile of the tracking error signal obtained from the positional relationship shown in FIG. 5.

As shown in FIG. 5, if the track pitch of recording tracks 19 formed by a series of information pits 11 is written as "a" and when the distance between the beam spot 12 and each of spots 13 and 14 in the radial direction of the disk is written as "b", then, by setting the value of distance "b" as a fraction, e.g., one-fourth, of track pitch "a" (i.e., b=a/4), a tracking error signal is obtained, which, as shown in FIG. 6, varies with the amount by which the recording information detecting beam spot 12 is biased from the center of a recording track. In the tracking servo system, the position of the pickup relative to the recording track 19 in the radial direction of the disk is so controlled that the tracking error signal described above is reduced to zero.

Figure 7:
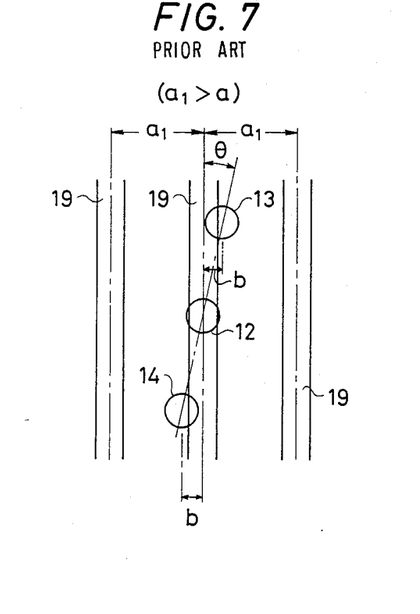
FIG. 7 is a diagram showing the position of a recording track relative to detecting beam spots assuming the used of a track pitch larger than the reference track pitch.
Figure 8:
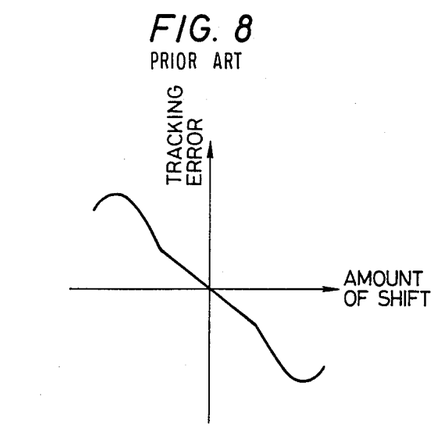
FIG. 8 is a profile of the tracking error signal obtained from the positional relationship shown in FIG. 7.
Figure 9:
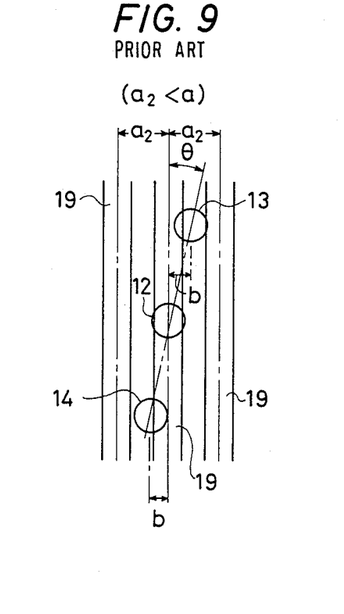
FIG. 9 is a diagram showing the position of a recording track relative to detecting beam spots assuming the use of a track pitch smaller than the reference track pitch.
Figure 10:
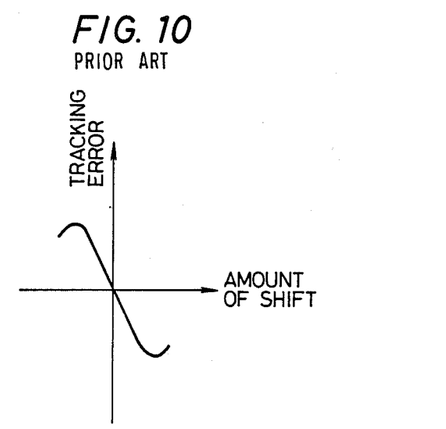
FIG. 10 is a profile of the tracking error signal obtained from the positional relationship shown in FIG. 9.

Now assume the use of a pickup wherein the distance "b" between the beam spot 12 and each of the spots 13 and 14 in the radial direction of the disk is preset on the basis of the track pitch "a". If the disk used has a track pitch "a1" wider than "a", as shown in FIG. 7, the tracking error signal obtained has a gentle slope in the region about the zero-crossing point as shown in FIG. 8. If, on the other hand, the disk has a track pitch "a2" narrower than "a", as shown in FIG. 9, the tracking error signal obtained has a small absolute value as shown in FIG. 10. Special modes of operation such as track jump and the control of tracking servo gains have to be performed periodically on the basis of tracking error signals, but if the tracking error signals undergo variations of the types described above, there is a high likelihood that the desired special modes of operation cannot be realized. In this connection, it should be noted that the relative positions of the beam spots 12, 13 and 14 cannot be easily altered.

Lastly, there exists a problem in the compatible optical recording/reproducing apparatus due to a difference in the optical system adapted to reproduce information from the video disk and the digital audio disk.

Specifically, a numerical aperture NA of the objective lens is generally determined by the space frequency of the video disk the reproduction mode. On the other hand, the amount of jitter is the predominant factor in the case of the digital audio disk. Therefore, in designing a compatible player capable of operating both the video disk and the digital audio disk in the reproduction mode with a single optical system, if the numerical aperture NA of the objective lens is set to a value optimum for one disk, the value is by no means optimum for the other disk and a signal with good S/N ratio cannot be obtained from the latter disk.

Figures 11, 12:
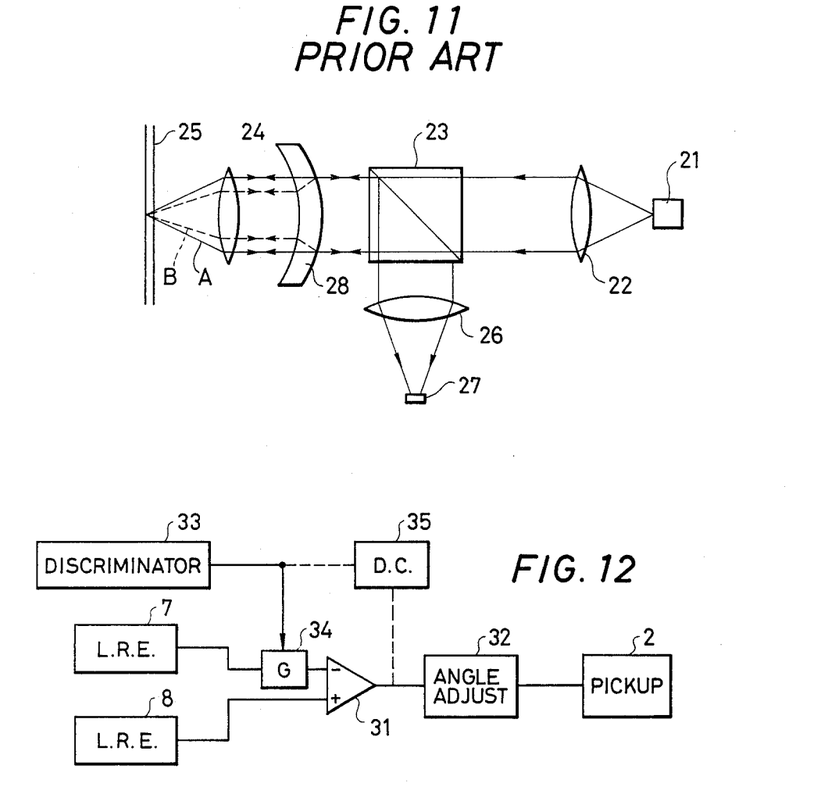
FIG. 11 is a front view of the conventional optical system.
FIG. 12 is a block diagram of the angle adjusting means for adjusting the angle of the inclination of a pickup in accordance with the present invention.

Two methods have conventionally been employed to deal with this problem: one is to use different types of objective lens 24 for reproducing information from different disks; and the other method is to employ a retractable corrective lens 28 between the beam splitter 23 and the objective lens 24 as shown in FIG. 11. In this second approach, the corrective lens 28 is retracted from the present optical path during reproduction on the video disk so as to provide an optical path A having an increased numerical aperture whereas in the mode of reproduction on the digital audio disk, the lens 28 is inserted into the present optical path so as to provide an optical path B having a decreased numerical aperture. However, the arrangement shown in FIG. 11 requires a complicated optical system which leads to a larger, and more costly apparatus.

In FIG. 11, reference numeral 21 denotes a light source from which a laser beam emanates and is passed through a collimator lens 22, a beam splitter 23, the corrective lens 28 (if projected), and the objective lens 24 to be focused on the disk 25. The laser beam reflected from the disk 25 travels back through the objective lens 24 and the corrective lens 28 (if projected) to enter into the beam splitter 23, where it is reflected and retracted to go to a condenser lens 26, from which the beam is focused on a light receiving element 27.

SUMMARY OF THE INVENTION

Accordingly, an object of the present invention is to provide a compatible recording reproducing apparatus which is capable of recording and reproducing information on both a larger-diameter video disk and a smaller-diameter digital audio disk, in which recording information on and reproducing information from both of the disks can be performed in a single apparatus.

According to one aspect of the present invention, a reference inclination of an optical axis of a laser beam with respect to a disk is made to be adjustable so as to be suitable for the disk being used.

According to another aspect of the present invention, a movement of a pickup in the radial direction of the disk is regulated depending upon the disk loaded on the apparatus.

According to still another aspect of the present invention, the relative angle formed between the line connecting a pair of beam spots with which the recording surface of the disk is illuminated and the line along a recording track which is substantially tangential to the beam spots is set to a value associated with the track pitch.

The apparatus according to the invention further employs an objective lens for focusing the laser beam onto the disk and the selection of the lens is determined depending upon a predetermined range of a numerical aperture of the objective lens.

DETAILED DESCRIPTION OF THE PREFERRED EMBODIMENTS

FIG. 12 shows a block diagram for realizing the adjustment of the angle of the optical axis in accordance with a preferred embodiment of the invention, wherein the angle detection means 9 composed of light source 5, and light-receiving elements 7 and 8 and other means have the same arrangements as shown in FIGS. 1A and 1B. Outputs from the light-receiving elements 7 and 8 are fed into a differential amplifier 31 and the resulting differential signal is supplied to an angle adjusting circuit 32 which performs adjustment of the angle of the pickup 2 and, hence, the optical axis. Reference numeral 33 denotes a discriminator that distinguishes between video and digital audio disks having different signal recording formats. This can be readily done by detecting the difference in such factors as the thickness of each disk, the diameter across the disk, its mass, reflectance and the recorded or reproduced signal. Numeral 34 denotes a gain control circuit disposed between the light-receiving element 7 and the differential amplifier 31. This circuit enables the gain of the signal outputted from the element 7 and applied to the inverting input of the amplifier 31 to be controlled in response to a signal from the discriminator 33.

In accordance with the present invention, the discriminator 33 determines whether the disk loaded on the recording/reproducing apparatus is a video disk or a digital audio disk (this may of course be effected by manual operation) and delivers an output signal indicative of a specific disk. In response to the signal from the discriminator 33, the gain control circuit 34 controls the gain of the signal supplied to the differential amplifier 31 from the light-receiving element 7. The circuit 34 automatically sets the reference position of the pickup 2 to angle $\theta v$ if the loaded disk is the video disk, and to angle $\theta a$ if the digital audio disk has been loaded. Therefore, the apparatus of the invention is capable of reproducing information under best conditions irrespective of the type of the disk being driven. The optimum value of angle $\theta_v$ is determined by monitoring the level of the reproduced RF signal while adjusting the incident angle of the beam. The optimum value of angle $\theta_v$ is achieved when a maximum level of the reproduced RF signal is observed. At this point the crosstalk, which is the leaking of information from adjacent tracks, will be at a minimum. By way of example, an allowable crosstalk is generally set to less than 35 decibles. However, an allowable amount of crosstalk depends upon a number of factors such as the pitch of adjacent tracks. Actual standards for determining the appropriate value of the crosstalk depends upon whether or not noises appear on the reproduced screen. As the amount of crosstalk increases according to the inclination of the incident angle, the noises become more apparent and appear as overlap images of the adjacent tracks. In a similar manner, the optimum value of angle $\theta_a$ is determined by monitoring the amount of jitter in the reproduced signal while adjusting the incident angle of the beam. The optimum value of angle $\theta_a$ occurs when the amount of jitter is reduced to a minimum.

In the above description, the input to the differential amplifier 31 is controlled so as to adjust the reference position of the pickup 2. Alternately, the output from the amplifier 31 may be controlled in response to the output from the discriminator 33. This can be implemented by providing a d.c. voltage generator 35 so that a predetermined voltage is superposed on the output of the amplifier 31 when one of the two disks (e.g., digital audio disk) has been detected. By this superposition, the output from the amplifier 31 is offset from that obtained when the other disk is detected, thus causing the reference position of the pickup 2 to be changed as in the case described in the previous paragraphs.

In the illustrated embodiment, the reference angle of the pickup 2 is set to a position associated with both RF signal and the amount of jitter. The reference position may also be associated with such information as crosstalk or tracking error level. It should also be understood that the concept of this embodiment may be applied to a recording system as well as a reproduction system.

As described, the apparatus of the present invention incorporates a mechanism for manually or automatically adjusting the reference angle of the optical axis of the pickup to a position associated with a specific type of disk being driven, so the apparatus is capable of ensuring information recording or reproduction in varying optical conditions.

Figure 13:
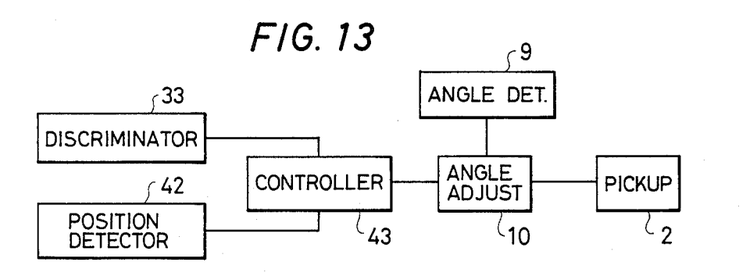
FIG. 13 is a block diagram for realizing angle adjustment in the information recording and reproducing apparatus of the present invention.

FIG. 13 shows a block diagram for realizing angle adjustment in accordance with the present invention. In the Figure, reference numeral 10 denotes an angle adjusting means that drives the pickup 2 in response to a signal from angle detection means 9 (having the same arrangement as shown in FIGS. 1A and 1B) so as to adjust the relative angle of the optical axis. The discriminator 33 distinguishes between the video disk and the digital audio disk as described in conjunction with FIG. 12. Reference numeral 42 denotes a position detector which detects the radial position of the pickup 2 with respect to the disk. This can be readily effected by operating a potentiometer, switch, etc. in association with a carrier (not shown) for driving the pickup 2 in the radial direction of the disk. Numeral 43 represents a controller which controls the angle adjustment means 10 in response to a signal from the discriminator 33 and position detector As described in connection with the prior art (FIGS. 1A and 1B), the angle adjusting means 10 will, in response to a signal from the angle detection means 9, adjust the position of the pickup 2 and hence, the inclination of the optical axis of the laser beam 4 issued from the objective lens 3 mounted on the pickup 2.

Figure 14:
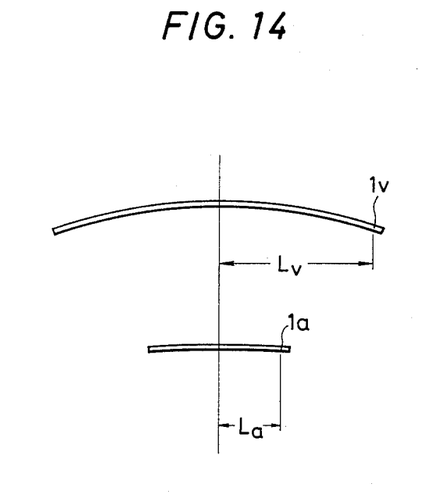
FIG. 14 is a front view of disks that are provided for illustrating the operating principle of the apparatus of the invention illustrated in FIG. 13.

When the disk 1 is loaded on the apparatus, the discriminator 33 determines whether the loaded disk is the video disk or the digital audio disk and delivers an output signal to the controller 43. The position detector 42 detects the position of the pickup 2 (laser beam 4) on the disk in its radial direction and supplies a detection signal to the controller 43. If the disk being presently reproduced is the video disk, the controller 43 controls the angle adjusting means 10 so that the pickup 2 is driven in response to a signal from the angle detection means 9 over the range of relatively along distance Lv from the center of the disk (e.g., from the innermost track to an intermediated track). If, on the other hand, the disk being reproduced is a digital audio disk, controller 43 controls the angle adjustment means 10 so that the pickup 2 is driven over the range of a relative short distance La (e.g., only tracks in the neighborhood of the inner periphery of the disk). As shown in FIG. 14, the smaller diameter digital audio disk 1a which is fitted over the spindle (not shown) will sag by a smaller degree than the video disk lv and experience a smaller change in the relative angle of the optical axis as between the inner and outer peripheries of the disk. With the digital audio disk, an error in the relative angle of the optical axis causes smaller effects in the radial direction than in the tangential direction (i.e., jitter direction), thus providing a relatively small permissible angle. Therefore, with the digital audio disk, no great deleterious effects will be caused even if the adjustment of optical axis is limited to relatively inner tracks.

If the position of the pickup 2 has exceeded the predetermined range, the signal from the angle detection means 9 immediately before that phenomenon is held so that the relative angle of the optical axis immediately before that phenomenon is maintained.

As described, the apparatus of the present invention is so designed that it detects the position of the record/reproduce means in the information recording disk in its radial direction and that depending on the detected position, the adjustment of the relative angle of the optical axis is controlled. Because of this arrangement, the apparatus has a minimum chance of misoperation even if the record/reproduce means has reached a point on the recording disk that is close to its outermost periphery. As a further advantage, greater freedom is allowed for designing the apparatus because of a reduced limitation on the position where the angle detection means is mounted on the record/reproduce means.

Another feature of the invention is hereunder described in detail by reference to FIGS. 15 through 18.

In accordance with this embodiment, the distance between beam spot 12 and each of the beam spots 13 and 14 in the radial direction of the disk is maintained constant irrespective of any change in the track pitch. In order to meet this requirement, the relative angle formed between the line connecting a pair of tracking information detecting beam spots 13 and 14 and the line along a recording track 19 on the disk surface that is tangential to these beam spots is set to a value associated with the track pitch.

Figure 15:
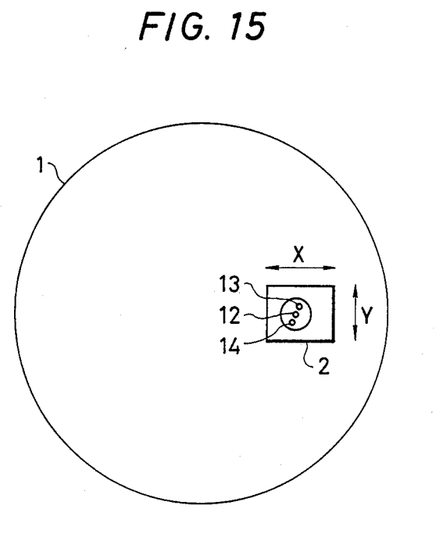
FIG. 15 is an illustration that shows the arrangement used in one embodiment of the invention.

The setting of the relative angle defined above may be performed as shown in FIG. 15 by moving, depending upon the track pitch, the disk 1 in direction Y which is substantially perpendicular to direction X (radial direction of the disk) in which the pickup 2 issuing three light beams is to be moved.

Figure 16:
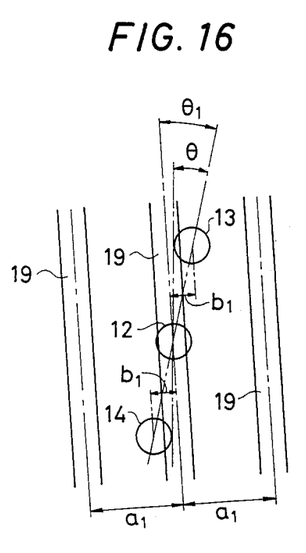
FIG. 16 illustrates the concept of the present invention for the case of using a track pitch larger than the reference track pitch.
Figure 17:
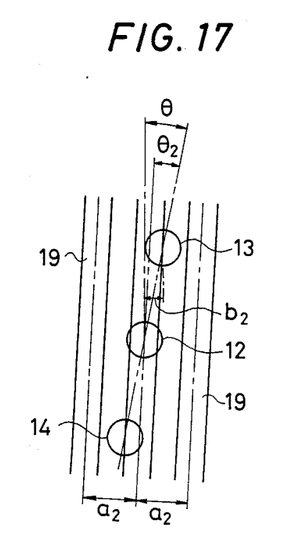
FIG. 17 illustrates the concept of the present invention for the case of using a track pitch smaller than the reference track pitch.

When the track pitch "a1" is greater than the reference track pitch "a" (as in FIG. 7), the disk 1 shown in FIG. 15 is moved downwardly with respect to the pickup 2. Since the track pitch is curved, the downward movement of the disk by a certain amount will cause a corresponding increase in the relative angle defined above and as shown in FIG. 16. The increased relative angle $\theta_1$ may be set to such a value that the distance "b1" between beam spot 12 and each of the beam spots 13 and 14 in the radial direction of the disk is equal to one-fourth of the track pitch "a1" (b1=a1/4). If the track pitch "a2" is smaller than the reference track pitch "a" (as in FIG. 9), the disk 1 shown in FIG. 15 is moved upwardly with respect to the pickup 2. As shown in FIG. 17, the upward movement of the disk by a certain amount will cause a corresponding decrease in the relative angle defined above. The decreased relative angle $\theta_2$ may be set to such a value that distance "b2" between beam spot 12 and each of the beam spots 13 and 14 in the radial direction of the disk is equal to one-fourth of the track pitch "a2" (b2=a2/4).

In the above description, the distance between beam spot 12 and each of the beam spots 13 and 14 in the radial direction of the disk is set at a value which is one-fourth of the track pitch. However, the distance may be set at different values depending upon the type of disk selected. Alternatively, the ratio of the distance t, the track pitch, may be set to fractional numbers other than one-fourth.

Figure 18A:
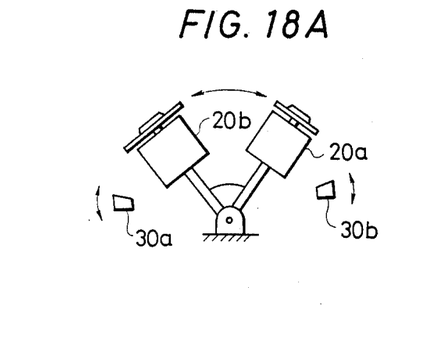
FIG. 18A and 18B schematically show two arrangements of the mechanism for shifting from one spindle motor to the other and vice versa in a compatible player capable of driving both a digital audio disk and a video disk.
Figure 18B:
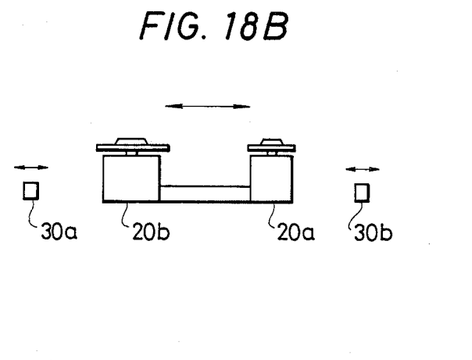

As shown in FIGS. 18A and 18B, a "compatible" disk player is so constructed as to allow for the shifting of one spindle motor 20a to the other spindle motor 20b and vice versa. In FIG. 18A, the two spindle motors 20a and 20b, one of which is expressly used for driving the digital audio disk and the other being used for driving the video disk, are swingably supported while they maintain a certain angular relation. When the spindle motor 20a contacts a stopper 30b, the other spindle motor 20b stands in a substantially upright position that enables reproduction on the video disk. If the spindle motor 20b contacts a stopper 30a, the spindle motor 20a stands in a substantially upright position which then enables reproduction to the digital audio disk. In FIG. 18B, the two spindle motors are spaced from each other but are arranged to be movable en masse. As mentioned above, which type of disk is driven depends on whether the stopper contacted by the set of spindle motors is 30a or 30b.

It will be understood by those skilled in the art that the positions of the spindle motors 20a and 20b in the radial direction of the disk, namely, the position of the disk 1 in Y direction in FIG. 15, may be readily altered by adjusting the positions of stoppers 30a and 30b. Therefore, by adjusting the positions of the stoppers depending upon the track pitch of the disk to be driven for reproduction mode, the distance between beam spot 12 and each of the beam spots 13 and 14 in the radial direction of the disk can be readily set to a value associated with the track pitch of the selected disk.

The positions of stoppers 30a and 30b may be adjusted manually depending upon the track pitch. Alternatively, an automatic feed mechanism may be used that performs automatic adjustment of the positions of the stoppers in response to the input information concerning the track pitch. The track pitch is determined for each of the disks to be driven, so the positions of the stoppers 30a and 30b can readily be adjusted for each disk by presetting their positions as calculated for the track pitch of each disk.

In the embodiment shown, the disk is made movable with respect to the pickup. Similar results may be obtained by using other position-adjusting techniques that are capable of changing the relative angle formed between the lines connecting a pair of tracking information detecting beam spots with which the recording surface of the disk is illuminated and the line along recording tracks on the disk that is tangential to said beam spots. For example, the pickup may be designed as being movable with respect to the disk. Alternatively, the relative positions of the disk and pickup are fixed in the radial direction of the disk and, instead, the pickup is made rotatable about the axis thereof (i.e., the recording information detecting beam spot).

As described, in accordance with the present invention, the relative angle formed between the line connecting a pair of tracking information detecting beam spots with which the recordinng surface of a disk is illuminated and the line along the recording track on the disk which is tangential to said beam spots is set to a value associated with the track pitch. Therefore, the invention provides an optical information recording and reproducing apparatus that is capable of consistent operation regardless of the track pitch used.

Figure 19:
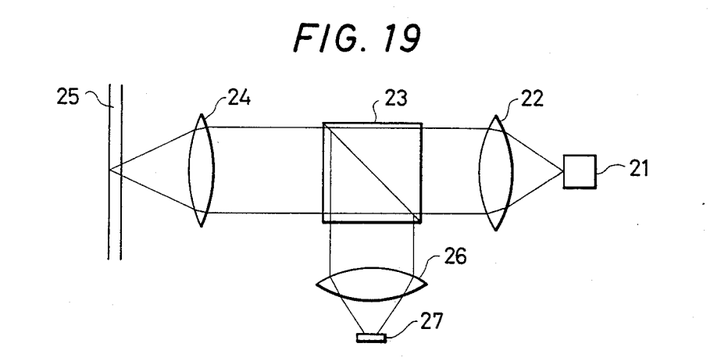
FIG. 19 is a front view of the optical system used in the apparatus of the invention.

FIG. 19 shows a basic arrangement of the optical system used in the apparatus of the present invention, and the components are the same as those shown in FIG. 12 are identified by like numerals. Simply stated, the optical system used in the apparatus of the present invention is composed of a light source 21, a collimator lens 22, a beam splitter 23, an objective lens 24, a condenser lens 26 and a light-receiving element 27 and has basically the same arrangement as that shown in FIG. 11 except that the corrective lens 28 is not incorporated in the optical system for the invention. What is unique about the invention results from the design requirement that the claimed apparatus be capable of recording or reproducing information on both the video disk and the digital audio disk with a single optical system. In order to need this requirement, the effective numerical aperture NA/$\lambda$ of the objective lens 24 is set at a value not lower than 0.57 but not higher than 0.68, provided that $\lambda$ is the wavelength in microns of the light from the light source 21 while NA is the numerical aperture of the objective lens 24.

Figure 20:
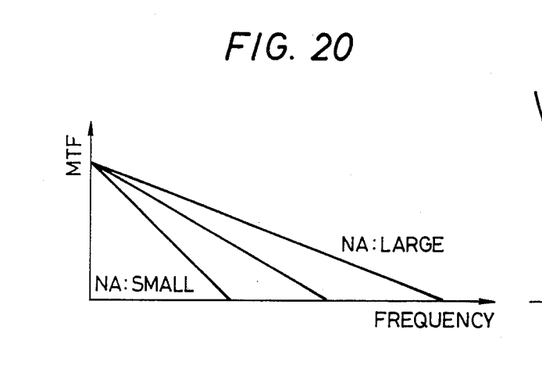
FIG. 20 is a characteristic diagram of a video disk.
Figure 21:
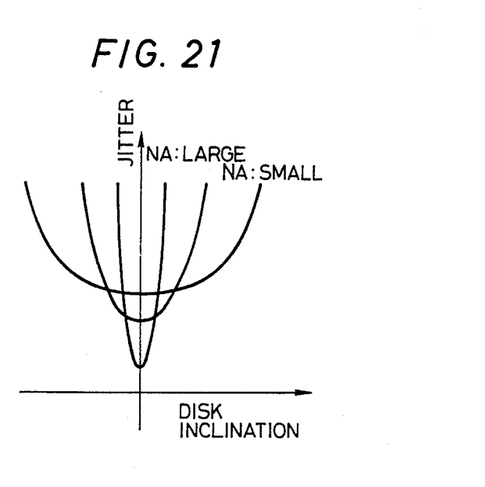
FIG. 21 is a characteristic diagram of a digital audio disk.

A typical profile of the relationship between the numerical aperture NA and the space frequency "f" of an optical system used in reproducing information on the video disk is shown in FIG. 20. This clearly shows that in the mode of reproduction on the video disk, greater values of NA are more advantageous for obtaining higher values of space frequency "f". If reproduction is made with the digital audio disk, the amount of jitter has a relation with the disk inclination as illustrated in FIG. 21. In this case, greater values of NA permit a corresponding decrease in the amount of jitter. On the other hand, the greater the value of NA, the more rapid will be the increase in the amount of jitter that may occur with an inclined disk. Therefore, if a safety factor must be allowed for the disk inclination, it will not be advisable to employ excessively great values of NA.

The operating parameters of the video disk have the following typical values: the track width is about 0.4 $\mu$m, the track pitch is about 1.67 $\mu$m, and the length of the shortest pit that is formed as a result of the recording of a signal of the highest frequency along the innermost periphery is about 0.5 $\mu$m. The beam spot usually has a diameter of 1.22 $\lambda$/NA ($\mu$m), so in consideration of intermodulation, crosstalk, etc., the numeral aperture NA for the video disk must be at least 0.45. Therefore, if the light source is assumed to emit light having a wavelength of 789 nm, the effective numerical aperture NA/$\lambda$ that is required is no less than 0.57.

If, on the other hand, the digital audio disk in reproduction mode is inclined by about 0.7 degree, the amount of jitter that occurs will be about 230 ns, which is the theoretical limit of reproduction that is in substantial agreement with the clock period. However, the practical limit for the amount of jitter that permits reproduction without requiring a special technique is approximately 120 ns that corresponds to the disk inclination of about 0.4 degree. In consideration of this fact, the numerical aperture NA for the digital audio disk must not be higher than 0.537. Therefore, assuming a light wavelength of 789 nm, the effective numerical aperture NA/$\lambda$ should not exceed 0.68.

As described, the apparatus of the present invention uses an objective lense whose effective numerical aperture is set to be within the predetermined range, so the apparatus permits the use of a simpler, more compact and less costly optical system. Furthermore, the apparatus enables information to be recorded or reproduced in optimum conditions on both the video disk and the digital audio disk.

What is claimed is:

1. A compatible apparatus for optically recording information on and reproducing information from a first, video disk and a second, audio disk, each of said disks having a plurality of parallel recording tracks said apparatus comprising: recording/reproducing means (2) for recording information on and/or reproducing information from said first and second disks utilizing a laser beam; discriminator means (33) for discriminating between a video disk and an audio disk by sensing at least one parameter selected from the group consisting of disk thickness, disk diameter, disk weight, disk surface optical reflectance, disk spindle hole diameter, and reproduced signal characteristics, angle detection means (9) for detecting a relative angle between an optical axis of light emitted (3) from said recording/reproducing means and a disk loaded into said apparatus; angle adjustment means (32) responsive to an output signal from said angle detection means for driving said recording/reproducing means in a manner to maintain a predetermined angle of said optical axis relative to said loaded disk, and means (34, 35) responsive to an output signal from said discriminator means for setting said predetermined angle at a first value during information recording and reproduction on said first disk and at a second value during information recording and reproduction on said second disk, wherein said first value ($\theta_v$) substantially maximizes an RF signal level and is different from said second value ($\theta_a$) which minimizes jitter.

2. An apparatus according to claim 1 wherein said angle detection means comprises a light emitting element, a pair of light receiving elements, said pair of light receiving elements receiving light emitted from said light emitting element and reflected from said disk, and a differential amplifier having a first input receiving an output of one of said pair of light receiving elements and a second input receiving an output of the other light receiving element.

3. An apparatus according to claim 2 wherein said angle adjustment means comprises gain controlling means connected between said one of the light receiving elements and said first input of said differential amplifier, wherein said gain controlling means operates in response to said first and second output signals outputted from said disk discriminator means.

4. An apparatus according to claim 1 further comprising position detection means for detecting a radial position of said recording/reproducing means with respect to said disk, wherein the relative angle of said optical axis is adjusted in response to a signal from said position detection means only when said recording/reproducing means is within a predetermined portion of the radius of said disk.

5. An apparatus according to claim 4 wherein when the position of said recording/reproducing means has exceeded said predetermined portion of the radius of said disk, the relative angle of said optical axis is maintained at a state immediately before the occurence of exceeding of said recording/reproducing means.

6. An apparatus according to claim 1 further comprising means for generating a tracking error signal, said tracking error signal being generated in response to outputs from a second pair of light receiving elements, and means by which a relative angle formed between a line connecting a pair of beam spots to be received in said second pair of light receiving elements and a line along a recording track is set to a value associated with a track pitch of the recording tracks on said disk.

7. An apparatus according to claim 6 wherein said value is set by changing the position of said recording/reproducing means relative to said disk in a direction substantially perpendicular to the radial direction of said disk.

8. An apparatus according to claim 6 wherein said value is set by rotating said recording/reproducing means about said optical axis.

9. An apparatus according to claim 1 further comprising an objective lens by which the laser beam is focused on said first and second disks has an effective numerical aperture NA/$\lambda$ of not lower than 0.57 but not higher than 0.68, where NA is a numerical aperture of said objective lens and $\lambda$ is a wavelength in microns of the laser beam.

* * * * *